Aug. 30, 1932. H. C. BELLEVILLE 1,874,423
AIRCRAFT LANDING
Filed June 22, 1929 2 Sheets-Sheet 1
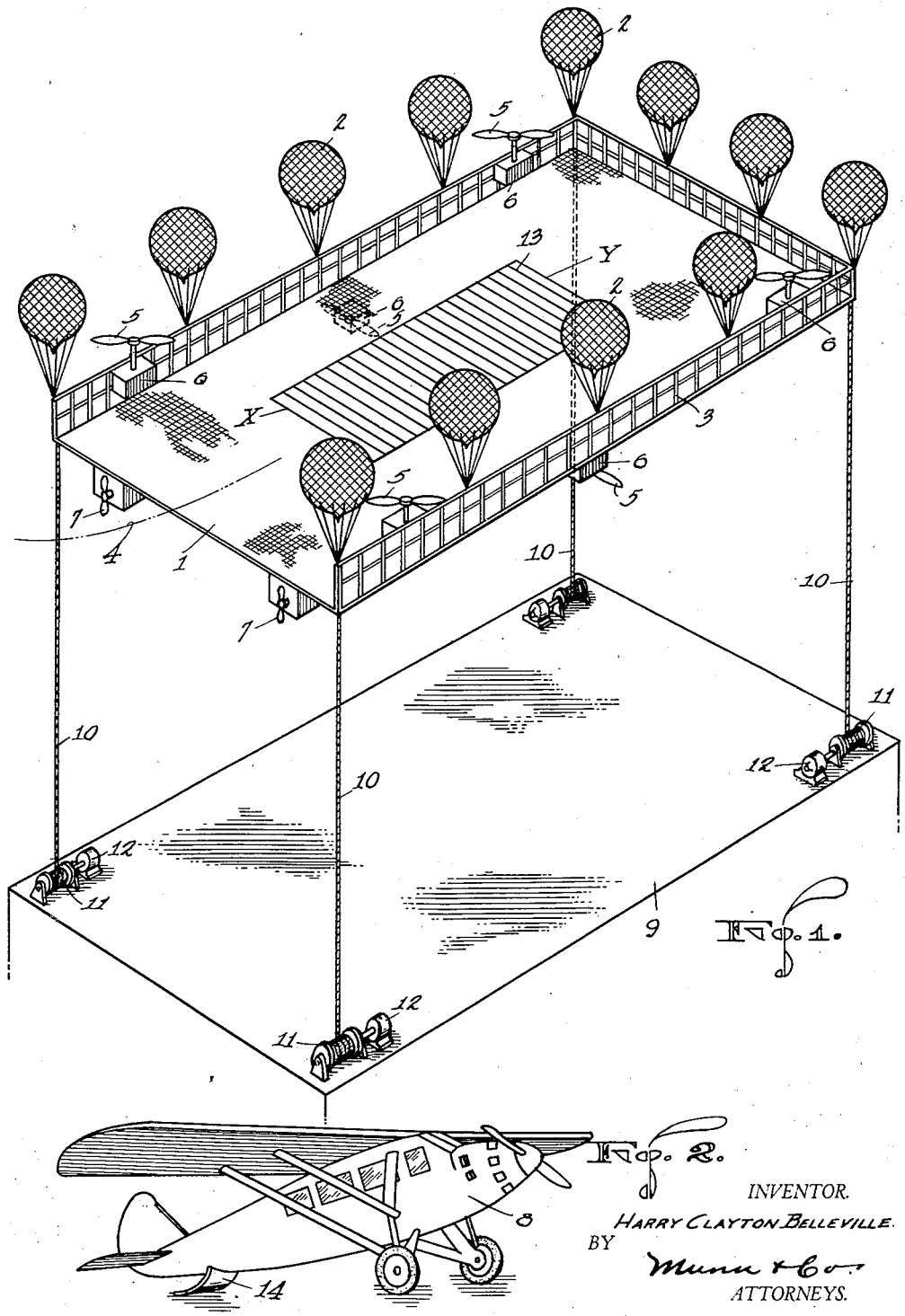

Aug. 30, 1932.   H. C. BELLEVILLE   1,874,423
AIRCRAFT LANDING
Filed June 22, 1929   2 Sheets-Sheet 2
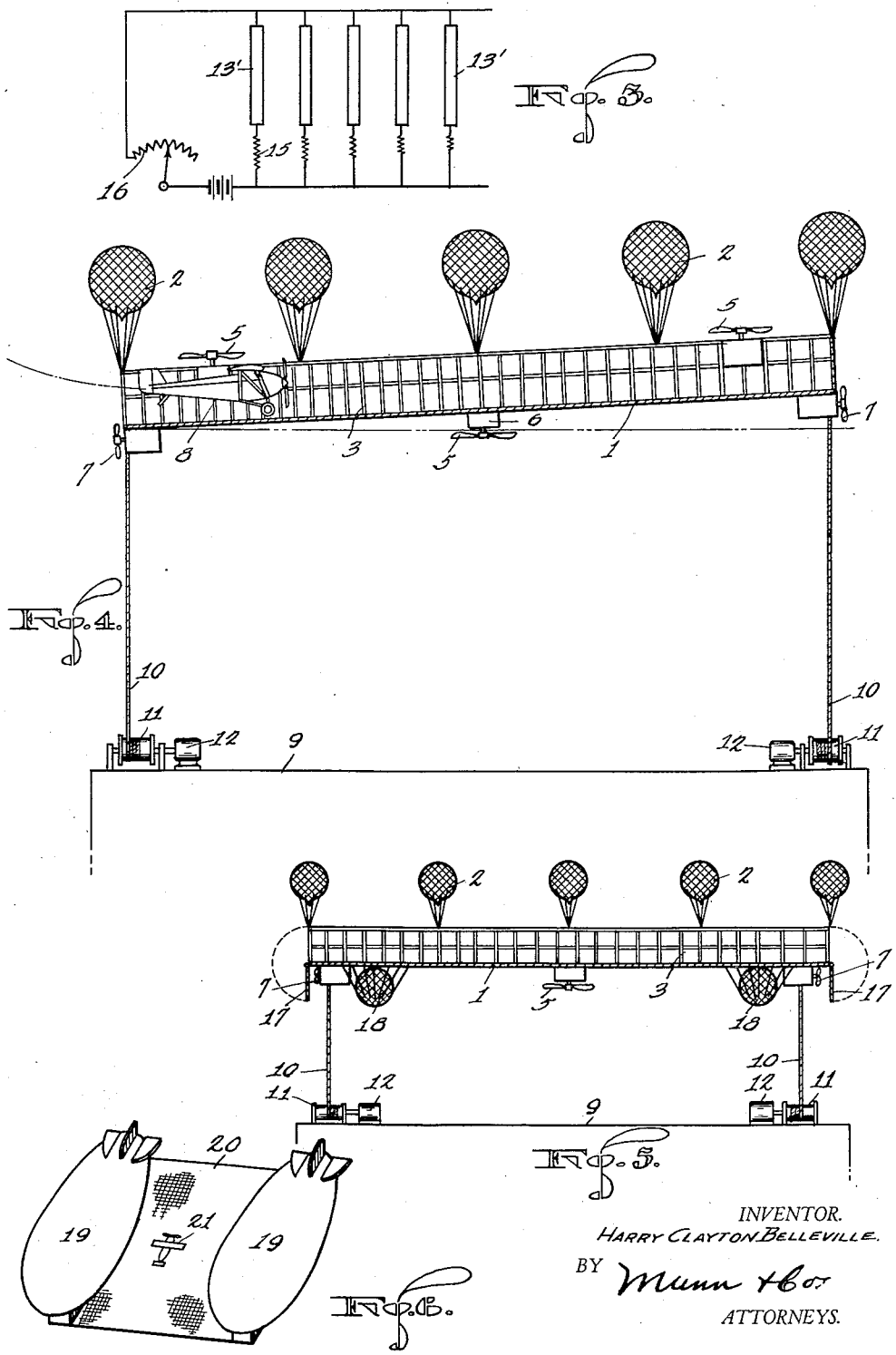
INVENTOR.
HARRY CLAYTON BELLEVILLE.
BY Munn & Co.
ATTORNEYS.

Patented Aug. 30, 1932

1,874,423

UNITED STATES PATENT OFFICE

HARRY CLAYTON BELLEVILLE, OF OAKLAND, CALIFORNIA

AIRCRAFT LANDING

Application filed June 22, 1929. Serial No. 372,882.

My invention relates to improvements in aircraft landings, and it consists in the combinations, constructions and arrangements hereinafter described and claimed.

An object of my invention is to provide an aircraft landing that is supported by buoyant members and adjustably anchored to the ground or to an object such as a building or a vessel on the water. It is also possible to support the landing by propellers that may be inclined at different angles so as to compensate for any wind and to keep the landing at a predetermined height in the air and to hold it stationary.

A further object of my invention is to provide an aircraft landing that may be supported by lighter than air members, these members being movable through the air so as to carry the landing in the same direction as the aircraft about to land. Dirigibles may be employed for this purpose.

A still further object of my invention is to provide a device of the type described which inclines the landing at an angle to bring the airplane to a stop, or which makes use of a novel magnetic brake for slowing up the airplane after landing, the braking force being applied at such a point as to prevent the airplane from nosing over, which often happens when a brake is applied to the supporting wheels of an airplane.

Other objects and advantages will appear as the specification proceeds, and the novel features will be particularly pointed out in the claims.

My invention is illustrated in the accompanying drawings, in which

Figure 1 is a perspective view of the landing device;

Figure 2 is a perspective view of an airplane, showing one part of the magnetic brake;

Figure 3 illustrates a wiring diagram used in connection with the magnetic brake;

Figure 4 is a section through Figure 1, and shows the landing field inclined for bringing the airplane to a more rapid stop;

Figure 5 is a modified form of landing field, in which the airplane may enter at one end and take off from the other; and Figure 6 is a perspective view of a movable landing field.

In carrying out my invention I provide a landing field indicated generally at 1, which is supported by lighter than air members such as balloons 2. A fence 3 encloses three sides of the field, and a broken line 4 shows where the airplanes enter and leave the field.

If desired, the lighter than air members 2 may be designed to support the field 1 without any extra load. When an airplane is about to land upon the field, propellers 5 may be started rotating to aid in supporting the field 1. These propellers may be disposed above the landing field or beneath it. The motors 6 carrying the propellers may be moved into different positions for swinging the propellers into various angles. In this way the wind may be compensated for, and the landing field 1 may be held in place.

Additional propellers 7 may be disposed at the ends of the field (see Figures 1 and 4) for keeping it taut when the field is supporting an aircraft 8.

In Figure 1 I have shown the landing field 1 as being secured to an object 9 by cables 10. The ends of these cables are passed around drums 11, the latter being actuated by electric motors 12 or other suitable means. The object 9 may be the roof of a building or a vessel out in the water, or it may be an area of ground. The cables 10 are wound and unwound independently of each other, and in this way the landing field 1 may be kept perfectly level.

It is possible to incline the landing field 1 in the manner shown in Figure 4. Two of the end cables 10 are unwound so as to permit the buoyant members to incline the landing field. The anchor may be varied so as to bring the airplane to an abrupt stop upon landing or to a gradual stop.

An additional method of bringing the airplane to a stop is shown in Figures 1 to 3 inclusive. A plurality of magnetized plates 13 is disposed on the flooring 1, (see Figure 1). The plates may be provided with increasing magnetism from the end X to the end Y.

In Figure 2, I show the tail-skid 14 of the airplane 8 as being flattened so as to contact with the plates 13. This skid may be made of metal and magnetized so as to be attracted by the plates 13. The tendency will be for the tail-skid 14 to be attracted by the plates 13 and to be held by the plates. This will give a braking force to the airplane, and this force will be increased as the tail-skid moves over the plates 13.

It should be noted that the braking force is applied to the rear end of the airplane and that there will be no tendency for the airplane to nose over as very often happens when the braking force is applied to the wheels.

I have further shown in Figure 3 a plurality of plates 13' in which the magnetism may be varied. These plates have cores, not shown, which are wound with wire, and the wire associated with each plate is provided with a resistance 15. The resistance for each plate varies so as to provide the first plate with the least amount of magnetism and the last plate with the greatest amount. In addition to this, a rheostat 16 may also be provided for varying the amount of magnetism in the plates 13'. In this way, the magnetism may be increased when it is desired to bring a rapidly-moving airplane to a stop and it may be decreased in all of the plates when a slower-moving airplane is to be brought to a stop.

In Figure 5, I show another modified form of the landing field. This form is identical with the form already disclosed, except that the fences 17 disposed at the ends of the field 1 are hinged so as to swing from operative position into inoperative position.

The balloons or lighter-than-air members 18 instead of being connected to the end fence, as shown in Figure 1, are disposed beneath the floor 1 and aid in supporting it. Both fences 17 may be dropped down, as shown in Figure 5, for permitting air planes to enter from one end and to take off from the other. This does away with the necessity of causing the airplane to make a complete turn in order to take off, which is the case in the form shown in Figure 1.

Still another form is shown in Figure 6. In this form, two dirigibles 19 support a landing field 20 therebetween and these dirigibles are designed to move the field in the direction in which the airplane is travelling. The airplane 21 can land far more readily when the field 20 moves therewith than when the field remains stationary. The point I wish to emphasize in this form of the device is that the field 20 is movable and at the same time is supported by lighter-than-air members. The movements may be controlled by operators positioned within the dirigibles 19.

Although I have shown and described several embodiments of my invention, it is to be understood that the same is susceptible of various changes, and I reserve the right to employ such changes as may come within the scope of the appended claims.

I claim:

1. A braking device for airplanes comprising a plurality of members laid in a course, a member carried by an aircraft and movable along the course, and means for creating opposite pole attractions between the member carried by the aircraft and the other members, the attraction of the members progressively increasing from one end of the course to the other at any one time, whereby the aircraft is brought to a gradual stop.

2. A braking device for airplanes comprising a row of members, means for magnetizing said members, the magnetism of said members at any one time progressively increasing from the start of the row to the end, a member carried by an aircraft and being attracted by said row of members for bringing the aircraft to a gradual stop.

3. A braking device for airplanes comprising a row of members, means for magnetizing said members, the magnetism of said members progressively increasing from the start of the row to the end, a member carried by an aircraft and being attracted by said row of members for bringing the aircraft to a gradual stop, and means for varying the magnetism of the row of members.

4. An aircraft landing field comprising a large supporting surface, lighter than air members carrying said support, propellers for aiding in lifting the surface and being independently controlled for compensating for wind pressures, whereby the surface is held against drifting.

5. A braking device for aircraft comprising a plurality of members arranged in a course, an electrical circuit for magnetizing the members and including a resistance for each of the members, said resistance progressively increasing from one end of the course to the other, and a member carried by an aircraft and being movable over the course of members when the aircraft is landing, whereby the latter is brought to a gradual stop.

6. A braking device for aircraft comprising a plurality of members arranged in a course, an electrical circuit for magnetizing the members and including a resistance for each of the members, said resistance progressively increasing from one end of the course to the other, and a member carried by an aircraft and being movable over the course of members when the aircraft is landing, whereby the latter is brought to a gradual stop, and a rheostat disposed in the circuit for varying the magnetism in the members.

7. An aircraft landing field comprising a substantially rectangular-shaped support for aircraft, lighter than air members for supporting the same; and means connected to the corners of the support for inclining the surface with respect to the horizontal.

8. An arcraft landing field comprising a substantially rectangular-shaped support for aircraft, lighter than air members for supporting the same, cables or the like anchored to the corners of the support, and means for independently controlling the length of each of the cables.

9. An aircraft landing field comprising a supporting surface for aircraft, lighter than air members for supporting the same, and means interconnecting the support with a fixed object, and including means for adjusting the surface at an angle with respect to the horizontal.

10. An aircraft landing field comprising a broad flat support for aircraft, lighter than air members for supporting the same and being disposed along the marginal edge thereof for providing an unobstructed runway, and means interconnecting the support with a fixed object and including means for adjusting the surface with respect to the horizontal.

HARRY CLAYTON BELLEVILLE.